Aug. 30, 1949.  M. E. WILKE  2,480,531
FLAT TYPE DRY CELL
Filed April 3, 1946
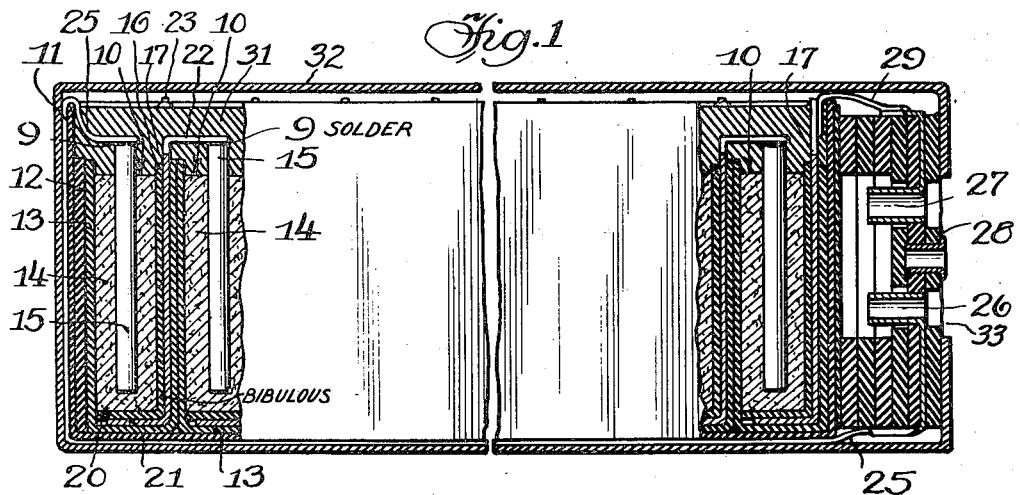
*Fig. 1*
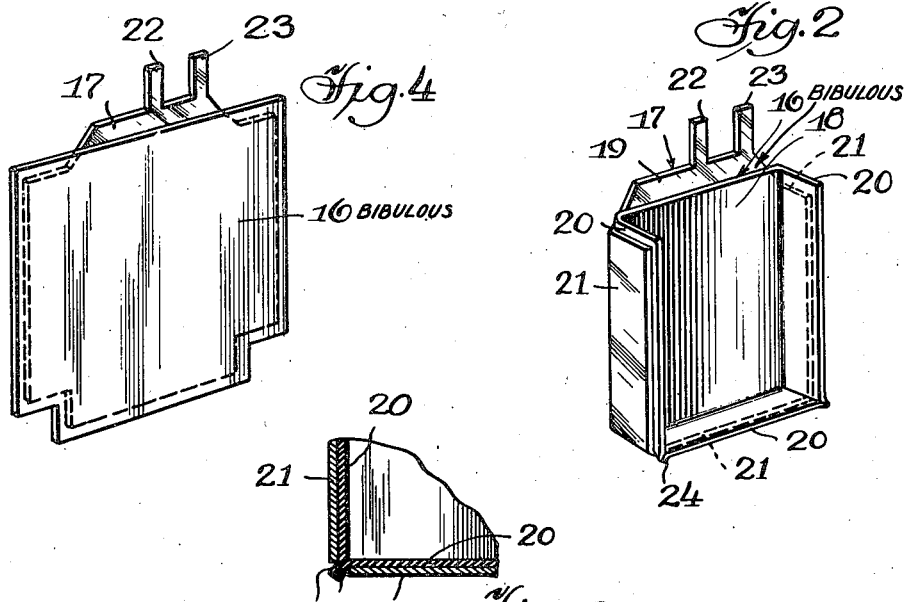
*Fig. 4*  *Fig. 2*  *Fig. 3*
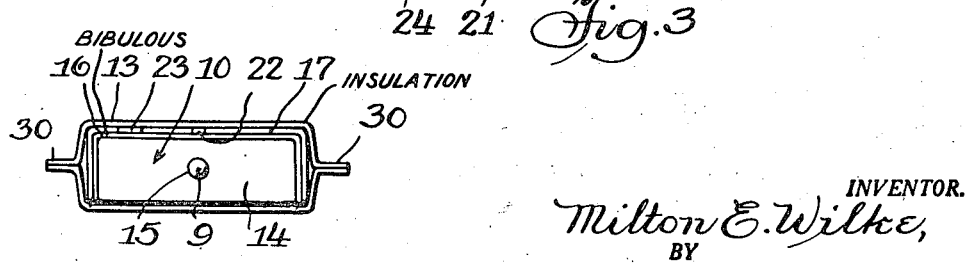
*Fig. 5*
INVENTOR.
Milton E. Wilke,
BY
Tesch and Darbo
Attys.

Patented Aug. 30, 1949

2,480,531

UNITED STATES PATENT OFFICE 2,480,531

FLAT TYPE DRY CELL

Milton E. Wilke, Freeport, Ill., assignor to Burgess Battery Company, Freeport, Ill., a corporation of Delaware Application April 3, 1946, Serial No. 659,198

7 Claims. (Cl. 136—111)

This invention relates to improvements in dry cells and batteries, and particularly to improved structures for dry cells of the flat type and the batteries of such cells.

The flat type of structure for dry cells is advantageous because it makes possible the highly efficient utilization of space.

It is the primary object of the invention to provide an improved structure for flat dry cells and batteries of such cells whereby the efficiency of space utilization is increased.

It is a further object of the invention to provide an improved structure for flat dry cells in which increased anode area is presented to the electrolyte and the body of active material of the cell.

It is a further object of the invention to provide an improved structure for flat dry cells in which the anode of increased area is effectively separated by a non-conductive element from the body of active material, which is at a potential different from that of the anode.

In the drawing:

Fig. 1 is a longitudinal view, partly in section, of a multiple cell battery employing the improved structure of the invention;

Fig. 2 is a perspective view of the anode member and the associated non-conductive member which separates the anode member from the body of active material;

Fig. 3 is an enlarged fragmental view, in section, of a corner of the associated anode and non-conductive members;

Fig. 4 is a perspective view of the anode member and the associated non-conductive member before they are shaped into their final form; and Fig. 5 is a top view of one of the cells before being assembled in the battery.

Fig. 1 shows a multiple cell battery of flat cells connected in series, each designated by the numeral 10. The cells may alternatively be connected in parallel or some in parallel and some in series, as would be suitable for making a combination A and B battery. The cells 10 are of flat rectangular shape having their smallest dimension extending in a direction longitudinally of the battery, and are arranged in juxtaposed relationship in an open top container 11 composed of suitable non-conductive material, such as heavy paperboard.

Commencing at the left hand end of the battery, as the same is viewed in Fig. 1, there is preferably arranged immediately against the interior surface of the end wall of container 11 a stiff sheet of suitable con-conductive material 12 which extends transversely of the battery. Adjacent to the sheet 12 is one wall of an open top envelope or pocket 13 which envelopes the first cell 10 upon all sides except the top. The pocket 13 is composed of a thin, flexible, non-conductive material which is resistant to the liquid of the cells, such as rubber, polymerized vinyl chloride, the copolymer of vinyl chloride and vinyl acetate, a rubber hydrochloride composition, or the like. The commercial films of the mentioned compositions which are available upon the market are suitable for use in constructing the pockets. The manner of their construction will be described hereinafter. Within the pocket 13 is a compressed body 14 of active material, which may be composed of powdered manganese dioxide ore and graphite or carbon, moistened with the liquid electrolyte of the cell, which may be an aqueous solution containing ammonium chloride and zinc chloride. The active body 14 is in the shape of a flat block having a height and thickness, as shown in Fig. 1, and a width several times its thickness as shown in Fig. 5. The dimensions of the body 14 are not critical and may be varied as desired, the dimensions given being merely an example of those which are suitable for a satisfactory cell.

Embedded substantially centrally within the active body 14 and projecting upwardly from the top of said body is the cathode 15 of the cell, which may be in the conventional form of a carbon rod having a small amount of solder 9 upon the upper end thereof. The next element in the sequence proceeding from left to right is the bibulous, non-conductive, separating member 16, which may be composed of absorbent paper, moistened with the liquid electrolyte. Said element 16 is in the form of a sheet which encloses the active body 14 upon one broad surface, which, for convenience, will be called the front, and the bottom and two sides thereof, as shown in Figs. 1 and 5. The succeeding element is the metal anode 17, which may be composed of zinc and is shaped similarly to separating member 16 and encloses the latter upon the front, bottom and two sides. Adjacent to the anode 17 is the right hand wall of the envelope or pocket 13, which completes the first cell 10.

The construction and arrangement of the anode 17 and the associated separating member 16 in accordance with the present invention are shown in Figs. 2 and 3. The separating member 16 has a flat main body section 18 and flanges 20 extending perpendicularly from the side and bottom edges of the main section in such manner as to enclose the sides and bottom of the active body 14. The anode 17 is similarly shaped and has main section 19 and flanges 21. The separating member nests snugly within the anode. The main section 19 of the anode is slightly higher than the main section 18 of the separating member, and has spaced apart lugs 22 and 23 projecting upwardly therefrom for a purpose which will be explained hereinafter. As is shown in Figs. 1 and 2, the main section 18 and the side flanges 20 of the separating member 16 have a height somewhat greater than that of the active body 14, and the side and bottom flanges 20 have a depth substantially equal to the thickness of the active body 14. The separating member, therefore, completely encloses the front, bottom and two sides of the active body. The flanges 20 of the separating member are somewhat longer and deeper than the flanges 21 of the anode and project beyond the edges of said flanges 21. This arrangement insures that the anode is electrically separated from the active body 14, which is at a potential different from that of the anode.

It is apparent from the foregoing description that in the improved construction of the present invention, active anode surface is presented to the bottom and the sides of the active body 14, in addition to the front thereof, whereby the area and quantity of active anode is increased very substantially over the amount which would be available if the anode flanges 21 were omitted. In fact, in the specific arrangement described, the active anode area is approximately doubled by the addition of the flanges. Such construction, therefore, very materially increases the available energy which can be obtained from the battery, and represents a more efficient utilization of the space within the battery. Inasmuch as the flat cell type of battery is frequently employed in situations where the space occupied must be reduced to a minimum, the construction of the invention provides an important advantage.

Means are provided at the bottom corners of the cell to insure that no active material of the body 14 comes in contact with the anode flanges 21 through any gaps which may occur where the separating member flanges 21 abut each other. As is shown in Fig. 3, the end portions 24 of the flanges 20 of the separating member project into the gap between the ends of the adjacent flanges 21 of the anode member.

The manner in which the association of the anode and separating member is accomplished is illustrated in Fig. 4. Flat blanks for the anode 17 and the separating member 16 are first formed in the relative size and shape shown, the bottom corners of both being notched to the depth of the anode flanges. The two blanks are arranged as shown with the edge portions of the flange sections of the separating member blank extending beyond the corresponding edge portions of the anode member blank, and while retaining such relationship, a rectangular jig member having a height and width approximately equal to the height and width of the active body 14 is placed against the separating member blank in the same relative position as is occupied by the active member 14 in the cell. The flange sections of the two blanks are then bent simultaneously over the jig by any suitable means to a position perpendicular to the main sections of the blanks. In this operation, the relative arrangement of the two members shown in Figs. 2 and 3 is automatically formed. The edge portions 24 at the ends of the separating member flanges extend beyond the ends of the anode flanges and automatically turn and project into the gap formed between the ends of the anode flanges.

It is to be noted in Fig. 4 that the separating member blank is not notched to a depth equal to the depth of the flanges of the separating member. When the flanges are bent, the flanges of both members bend along the same lines, which extend from the corners of the notches in the anode blank in directions parallel to the edges of said blank. The material of the separating member flanges located inwardly of the corner of the notch in said member does not wrinkle or bunch, but is compressed together against the jig and forms a flat rectangular corner of solid material at the base of the flanges. From the corner of the separating member notch outwardly, the material of said member extends a progressively increasing distance into the gap between the adjacent ends of the anode flanges, as shown at 24 in Fig. 3. A tight fit is formed which serves as a gasket through which it is substantially impossible for any of the material of the active body 14 to pass, whereby short circuits between the active body and the anode are prevented.

A suitable method for enclosing the cells 10 in the pockets 13 is illustrated in Fig. 5. A sheet 13 of the flexible non-conductive material of the proper width is arranged with its midsection against the bottom of the cell and is folded upwardly so that it covers the bottom and the front and back of the cell. The material of the sheet is then folded inwardly over the sides of the cell until the portion extending from the front meets the portion extending from the back, when the portions are folded outwardly in contact with each other and are pressed together and adhesively joined to form the joints 30 which complete pocket 13. In the completed battery, the joints 30 are folded against the sides of the cells so as to occupy a minimum of space.

The construction and arrangement of the next succeeding cell is the same as has been described, the second pocket 13 being arranged adjacent to the first pocket and the elements of the cell being arranged within the pocket in the manner which has been described. The remaining cells are assembled in a similar manner, the arrangement of the final assembly being such that the cells are under compression in a direction longitudinally of casing 11. The terminal lug 22 of the anode 17 of the first cell is bent horizontally to the right and into contact with the cathode 15 of the second cell, suitable electrical connection between said anode and cathode being made by momentarily heating the end portion of the lug 22 in such manner as to melt the solder tip 9, whereby said tip forms a solder joint between the electrodes. The two cells are thereby connected in series and the remaining cells are connected in series in a similar manner. A conductor 25 is suitably connected to the cathode 15 of the first cell and extends around the outside of the container 11 and is connected to the terminal 26 of the conventional socket-type of terminal member 28, which is arranged exteriorly adjacent to the righthand end of container 11. In a similar manner, a conductor 29 is suitably connected to the anode 17 of the last cell and extends to the exterior of container 11 and is connected to the terminal 27 of terminal member 28. A seal closure 31 closes the open tops of the cells 10 and the container 11 to form a common seal for the cells and the battery. Closure 31 may be composed of the usual fusible wax or pitch sealing composition, which may be poured into place in the molten condition.

The second lug 23 extending upwardly from each of the anodes 17 projects through the closure 29 and the end thereof is exposed. After the battery has been formed as described, it is preferably aged for a number of days or weeks and the cells are then tested individually for defects by connecting a voltmeter between the lugs 23 of adjacent cells. After the battery has been completed and tested, it is enclosed in an outer carton 32 of suitable non-conductive composition, such as heavy paperboard. The battery terminal 28 is exposed through an opening 33 in the end of the carton 32.

While a single embodiment of the invention has been described, this is for purposes of illustration, and the invention is not limited thereto. Various modifications may be made in the structure and composition of the cells and the battery and the parts thereof without departing from the spirit of the invention. For example, the cells may be of other than the rectangular shape shown. Also, the testing lugs 23 may be omitted. Also, means different from the pockets 13 may be employed for physically isolating the indivdual cells. The structure of pockets 13 does not form a part of the invention. In a similar manner, other modifications may be made in the construction of the battery and the parts thereof.

What is claimed is:

1. In a dry cell, a body of active material having flat sides, a flat metal electrode adjacent to a side of said active body, and a separating sheet of bibulous non-conductive material between said active body and said electrode, said metal electrode and said bibulous sheet having flanges along adjacent edges thereof enclosing additional sides of said active body, the material of said bibulous sheet extending between the flanges of said metal electrode at the junctions of said flanges.

2. In a dry cell, a body of active material having flat sides, a flat metal electrode adjacent to a side of said active body, and a separating sheet of bibulous non-conductive material between said active body and said electrode, said metal electrode and said bibulous sheet having flanges along adjacent edges thereof enclosing additional sides of said active body, the material of said bibulous sheet extending between the ends of adjacent flanges of said metal electrode and forming a gasket between said flange ends.

3. In a dry cell, a body of active material having flat sides, a flat metal electrode adjacent to a side of said active body, and a separating sheet of bibulous, non-conductive material between said active body and said electrode, said metal electrode and said bibulous sheet having flanges along adjacent edges thereof enclosing additional sides of said active body, the adjacent ends of the flanges of said metal eelctrode being in proximity to each other, the end portions of the flanges of said bibulous sheet extending into and substantially filling the crevices between said adjacent ends of the flanges of said metal electrode.

4. In a dry cell, a body of active material having flat surfaces consisting of a front, back, top, bottom and two sides, a flat metal electrode adjacent to the front of said active body, and a separating sheet of bibulous, non-conductive material between said active body and said electrode, said metal electrode and bibulous sheet having flanges along three adjacent edges thereof encompassing the bottom and two sides of said active body, the material of said bibulous sheet extending between the ends of adjacent flanges of said metal electrode and forming a gasket between said flange ends, and a second electrode projecting from the top of said active body.

5. In a dry cell, a body of active material having flat surfaces consisting of a front, back and two sides, a flat metal electrode adjacent to the front of said active body, and a separating sheet of bibulous, non-conductive material between said active body and said electrode, said metal electrode and bibulous sheet having flanges along three adjacent edges thereof encompassing the bottom and two sides of said active body, the material of said bibulous sheet extending between the ends of adjacent flanges of said metal electrode and forming a gasket between said flange ends.

6. A negative electrode for a dry cell comprising a metallic plate having a flat rectangular area, side flanges extending at right angles from the long sides of said area, and an end flange extending at a right angle from a short side of said area, the ends of said end flange being near but spaced from the contiguous ends of said side flanges.

7. In a dry cell, a metal electrode having a flat body portion and flanges along three adjacent sides of said body portion, a layer of bibulous non-conductive material lining said body and flanges, a body of active material having flat sides in contact with said bibulous layer and enclosed thereby upon a broad side and three edges to leave a broad side and one edge exposed, a non-conductive liquid impervious envelope enclosing the foregoing assembly on all sides except the exposed edge of said active body, and an elongated conductive terminal embedded in said active body and projecting from said exposed edge of said active body.

MILTON E. WILKE.

REFERENCES CITED

The following references are of record in the file of this patent:

UNITED STATES PATENTS

| Number | Name | Date |
|---|---|---|
| 1,484,926 | Benner | Feb. 26, 1924 |
| 2,155,128 | Gray | Apr. 18, 1939 |

FOREIGN PATENTS

| Number | Country | Date |
|---|---|---|
| 24,147 | Sweden | Feb. 15, 1908 |

Certificate of Correction

Patent No. 2,480,531 August 30, 1949

MILTON E. WILKE

It is hereby certified that errors appear in the printed specification of the above numbered patent requiring correction as follows:

Column 5, line 64, for "eelctrode" read *electrode*; column 6, line 18, after the word "back" insert , *top, bottom*;

and that the said Letters Patent should be read with these corrections therein that the same may conform to the record of the case in the Patent Office.

Signed and sealed this 17th day of January, A. D. 1950.

[SEAL]

THOMAS F. MURPHY,
*Assistant Commissioner of Patents.*